(12) United States Patent
Edwards et al.

(10) Patent No.: US 12,054,327 B2
(45) Date of Patent: Aug. 6, 2024

(54) METHOD OF ASSEMBLING AND DISPENSING A BEVERAGE FROM A KIOSK

(71) Applicant: Drop Water Corporation, Menlo Park, CA (US)

(72) Inventors: Scott Paul Edwards, Menlo Park, CA (US); William Gregory Tammen, Durham, NC (US)

(73) Assignee: Drop Water Corporation, San Luis Obispo, CA (US)

( * ) Notice: Subject to any disclaimer, the term of this patent is extended or adjusted under 35 U.S.C. 154(b) by 768 days.

(21) Appl. No.: 17/093,476

(22) Filed: Nov. 9, 2020

(65) Prior Publication Data

US 2021/0053733 A1 Feb. 25, 2021

Related U.S. Application Data

(62) Division of application No. 15/360,033, filed on Nov. 23, 2016, now Pat. No. 10,829,280.

(Continued)

(51) Int. Cl.
| | |
|---|---|
| *B65B 3/04* | (2006.01) |
| *B65B 7/28* | (2006.01) |
| *B65B 43/42* | (2006.01) |
| *B65B 61/20* | (2006.01) |
| *B65D 3/10* | (2006.01) |
| *B65D 3/28* | (2006.01) |
| *B65D 8/00* | (2006.01) |
| *B65D 21/02* | (2006.01) |
| *B65D 25/16* | (2006.01) |

(Continued)

(52) U.S. Cl.
CPC .............. *B65D 53/02* (2013.01); *B65B 3/045* (2013.01); *B65B 7/28* (2013.01); *B65B 7/2835* (2013.01); *B65B 61/202* (2013.01); *B65D 3/10* (2013.01); *B65D 3/28* (2013.01); *B65D 15/04* (2013.01); *B65D 21/0233* (2013.01); *B65D 25/16* (2013.01); *B65D 41/02* (2013.01); *B65D 65/466* (2013.01); *B65B 3/04* (2013.01); *B65B 43/42* (2013.01); *Y02W 90/10* (2015.05)

(58) Field of Classification Search
CPC .. B65B 3/04; B65B 3/045; B65B 7/28; B65B 7/2835; B65B 43/14; B65B 43/42; B65B 43/44; B65B 61/202; G07F 13/10
USPC .................................. 53/457, 468, 281, 282
See application file for complete search history.

(56) References Cited

U.S. PATENT DOCUMENTS 3,377,775 A * 4/1968 Mattimoe et al. ...... B65B 43/40
53/284.7
4,815,256 A * 3/1989 Brown et al. ........... G07F 13/10
53/469

(Continued)

FOREIGN PATENT DOCUMENTS

JP S5713594 1/1982
JP H 02-057507 2/1990

(Continued)

*Primary Examiner* — Stephen F. Gerrity
(74) *Attorney, Agent, or Firm* — DLA Piper LLP (US)

(57) ABSTRACT

The present invention relates to a novel beverage container and associated mechanism and process for removing a cap from a closure structure in the container, filling the container, securing the cap, and dispensing the container. The beverage container comprises a compostable shell, a cap, a closure structure, and a beverage bag.

20 Claims, 15 Drawing Sheets

Related U.S. Application Data

(60) Provisional application No. 62/386,472, filed on Dec. 3, 2015.

(51) Int. Cl.
  B65D 41/02 (2006.01)
  B65D 53/02 (2006.01)
  B65D 65/46 (2006.01)

(56) References Cited

U.S. PATENT DOCUMENTS

| | | | | |
|---|---|---|---|---|
| 6,230,472 | B1* | 5/2001 | Stahlecker | B67C 7/0073 53/89 |
| 6,256,964 | B1* | 7/2001 | Drevfors | B65B 55/025 53/426 |
| 8,413,409 | B2* | 4/2013 | Nighy et al. | B65B 3/045 53/281 |
| 2007/0259139 | A1* | 11/2007 | Furneaux | B65D 65/466 428/34.3 |
| 2008/0041018 | A1* | 2/2008 | Stephenson | B65B 3/045 53/449 |
| 2009/0202687 | A1 | 8/2009 | Griego | |
| 2010/0084048 | A1* | 4/2010 | Chen | G07F 13/10 141/129 |
| 2014/0290181 | A1 | 10/2014 | Edwards et al. | |
| 2014/0290182 | A1 | 10/2014 | Wintring et al. | |
| 2014/0353202 | A1* | 12/2014 | Park | B65D 65/466 206/524.6 |
| 2016/0347512 | A1* | 12/2016 | Horner | B65D 65/466 |
| 2018/0068515 | A1 | 3/2018 | Edwards | |

FOREIGN PATENT DOCUMENTS

| | | |
|---|---|---|
| JP | 2004-168342 A | 6/2004 |
| JP | 2008-018962 A | 1/2008 |
| JP | 2010-536682 | 12/2010 |

* cited by examiner

FIGURE 1A
FIGURE 1B
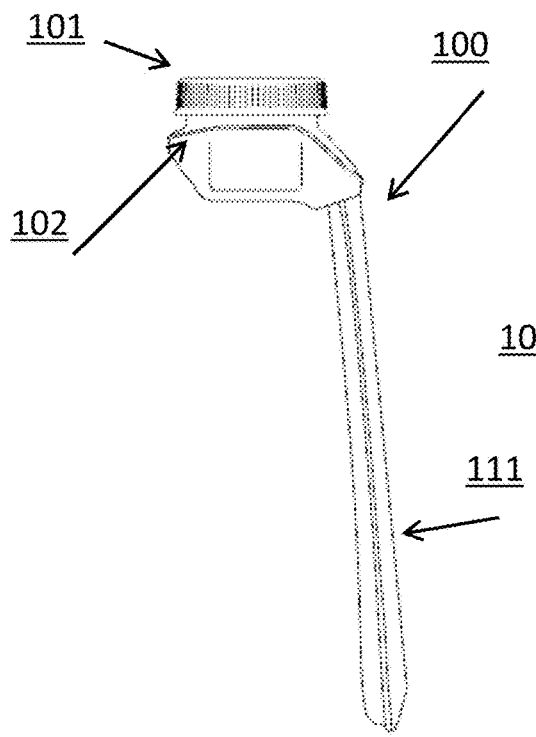
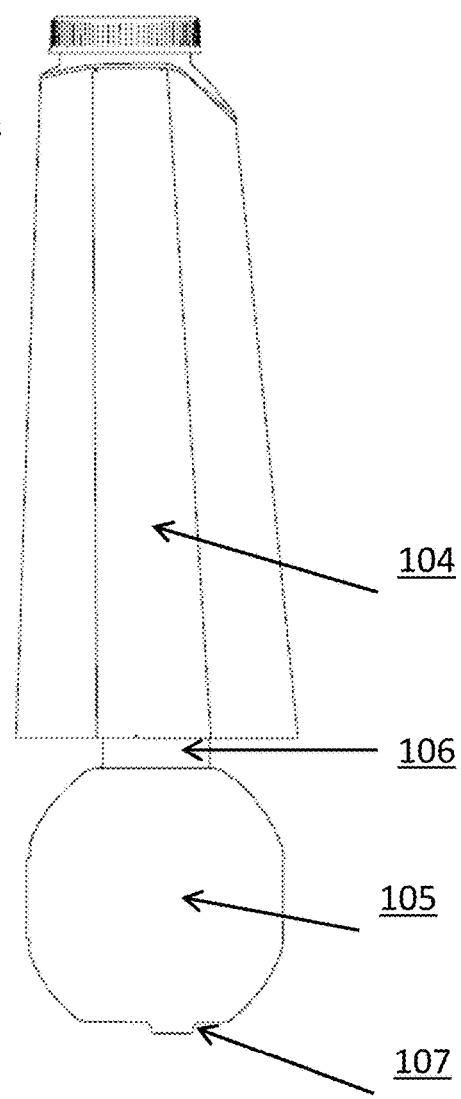

FIGURE 2A
FIGURE 2B
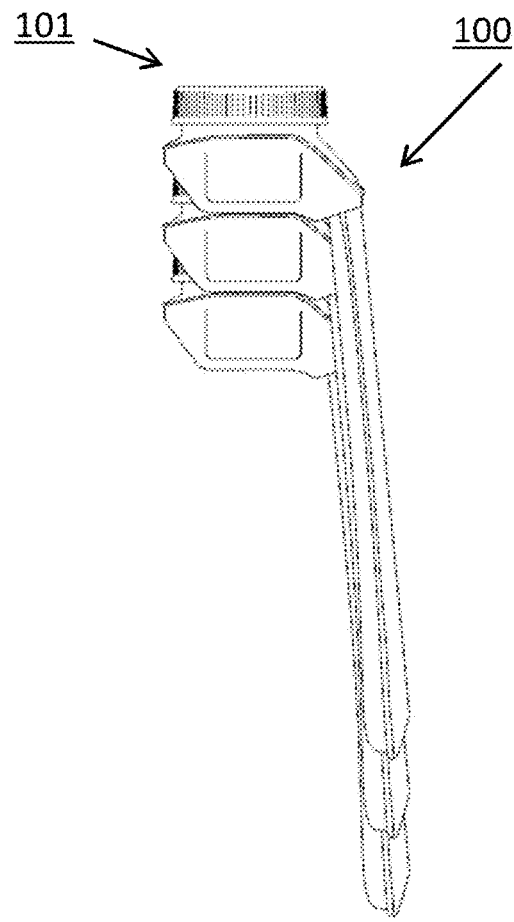
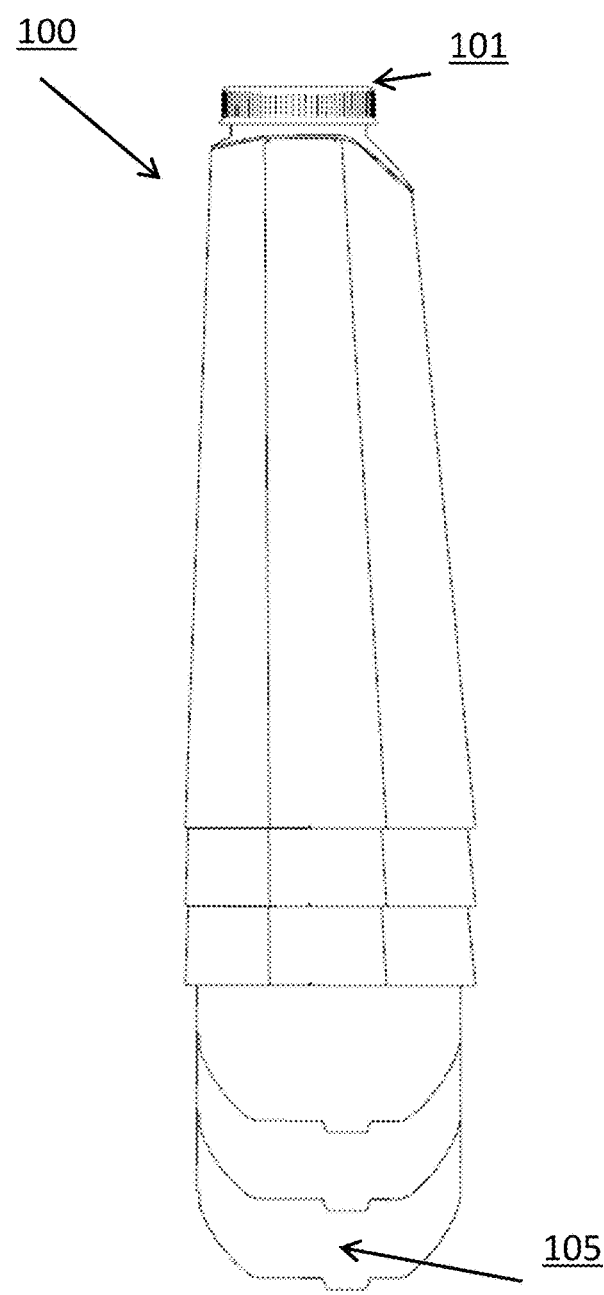

METHOD OF ASSEMBLING AND DISPENSING A BEVERAGE FROM A KIOSK

PRIORITY CLAIM

This application is a divisional application of U.S. patent application Ser. No. 15/360,033, filed on Nov. 23, 2016, titled, "Compostable Single-Use Beverage Container and Associated Mechanism for Sealing the Container," and issued on Nov. 10, 2020, as U.S. Pat. No. 10,829,280, which claims priority under 35 USC Sections 119(e) and 120 to U.S. Provisional Patent Application Ser. No. 62/386,472, filed on Dec. 3, 2015 and titled "Capper System for Eco-Friendly Beverage Dispensing Kiosk," both of which are incorporated by reference herein.

TECHNICAL FIELD

The present invention relates to a novel beverage container and associated mechanism and process for removing a cap from a closure structure in the container, filling the container, securing the cap, and dispensing the container.

BACKGROUND OF THE INVENTION

The traditional consumer beverage industry is inefficient and wasteful because of the massive amount of that must be transported and the amount of plastic used to contain that liquid. Furthermore, the packaging materials used must be very robust in order to survive a long distribution chain and shelf life, making natural degradation nearly impossible which causes environmental harm when waste from this industry is mismanaged.

The prior art method used by the traditional consumer beverage industry for creating and distributing consumer beverages (such as bottled water, sports drinks, carbonated drinks, and flavored water) is to injection blow mold a rigid container with a screw cap closure out of PET (polyethylene terephthalate), fill the container, seal it, palletize it, and ship it around the world. This method demands a robust packaging material which ensures the beverage will get to the consumer unharmed and ready to drink; however, this also means the package will be excessively hard to be broken down by nature which has caused massive amounts of plastic waste to accumulate in waterways, as observed by the NOAA. In addition, it is well-known that disposable plastic bottles and other containers being consumed on a global scale have caused massive ecological damage due to the consumption of fossil fuels to transport beverages from the bottling plant to the consumer.

Applicant previously filed U.S. patent application Ser. No. 14/242,295, titled "System and Method for Eco-Friendly Beverage Dispensing Kiosk" (the "Kiosk Application") on Apr. 1, 2014, which is incorporated herein by reference. The Kiosk Application describes a novel automated kiosk for dispensing filtered water from a local water supply into beverage containers. The beverage containers are pre-loaded into the kiosk and stacked in a space-efficient manner. The automated kiosk described in the Kiosk Application has been successful in providing an environmentally-friendly improvement over traditional consumer beverage dispensing machines. However, based on Applicant's experience, certain improvements are still needed, particular in the design of the beverage container itself and the mechanism by which the bottle is assembled, filled, and capped within the kiosk.

SUMMARY OF THE INVENTION

Applicant has invented an improved beverage container design for use with the invention of the Kiosk Application. Applicant has further invented an improved system and method for assembling the beverage container, filling the container, and securing a cap to the container within the kiosk.

The present invention relates to a novel beverage container and a mechanism for securing a cap to the container within an automated kiosk. The container comprises a compostable shell, beverage bag, and other components. The beverage bag is sealed to a closure shoulder using a mechanical sealing ring, optionally without the use of using heat, glue or ultrasonic energy. The cap is secured to the closure shoulder by the mechanism within the kiosk. The container is an easily biodegradable (e.g., "compostable" or "home compostable" under ASTM standards) container for use in the sale of bottled water and other beverages. It is designed for use in beverage kiosks, including but not limited to the disclosed kiosk in the Kiosk Application, that fill the container onsite at the time of purchase. It is designed in such a way that it can pass the tests needed for certification by various standards bodies to be designated and sold as "compostable" or "home compostable" or with a similar designation.

In one aspect of the invention, a mechanical sealing insert is used to attach a beverage bag to a closure shoulder of the beverage container.

In another aspect of the invention, the shell of the container is comprised of a sheet material, including but not limited to paper, paperboard, and/or laminated cellulose fiber that is cut, and or die cut and folded into a rigid three dimensional body with one-way paperboard locking flaps for the purpose of retaining the liquid holding closure assembly, optionally without the aid of glue, heat, ultrasonic means, or any other adhesion techniques.

In another aspect of the invention, the container is designed to nest with other containers of the same kind while the internal surfaces of the liquid holding assembly are sealed to ensure sterility during transportation and storage.

In another aspect of the invention, a system and method for fitting a sealing cap to a beverage container in the kiosk as part of the filling and delivery process is utilized. The invention removes a beverage container body from a stack stored in the kiosk, unscrews a previously-fitted cap from the beverage container, positions the beverage container for filling, screws the cap back onto the beverage container, and performs all necessary movement of the beverage container through the process.

The present invention, as with the invention of the Kiosk Application, enables users to avoid the harmful prior art means of packaging and distributing of beverages by enabling the use of the environmentally friendly materials and by not filling the beverage container until the customer purchases it, which eliminates the unnecessary transportation of water, reducing transportation cost and $CO_2$ emissions by significantly more than an order of magnitude.

BRIEF DESCRIPTION OF THE DRAWINGS

FIGS. 1A and 1B depict a side-view of certain components of the inventive beverage container.

FIGS. 2A and 2B depict a side-view of a nested stack of multiple units of the inventive beverage container.

DETAILED DESCRIPTION OF THE PREFERRED EMBODIMENTS

Figure 3A:
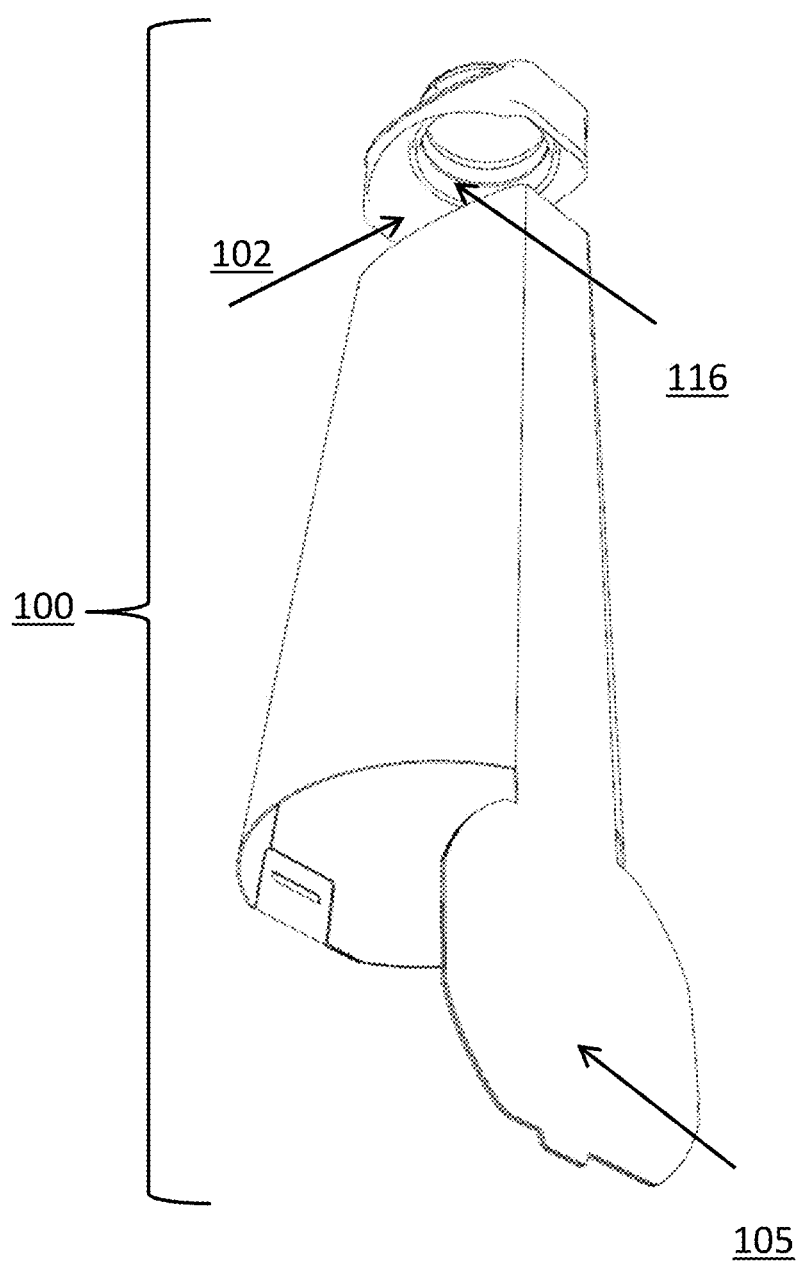
FIGS. 3A, 3B, and 3C depict another side-view of certain components of the inventive beverage container.

An embodiment of the invention is depicted in FIGS. 1-8. FIGS. 1A and 1B depict side-views of beverage container 100. With reference to FIG. 1A, beverage container 100 comprises cap 101, closure shoulder 102, and beverage bag 111. With reference to FIG. 1B, shell 103 is now depicted. Shell 103 comprises body 104, hinge 106, and bottom flap 105. Bottom flap 105 comprises notch 107.

FIGS. 2A and 2B depict side-views of a stack of beverage containers 100. As can be seen, beverage container 100 is designed to allow a nested configuration wherein multiple units of beverage container 100 are stacked. Each beverage container 100 contains cap 101 already secured to its closure shoulder 102. The cap 101 of a first unit can fit within the closure shoulder 102 of a second unit stacked on top of the first unit. The bottom flap 105 of each unit is open and nested together as shown in FIG. 2B.

Figure 3B:
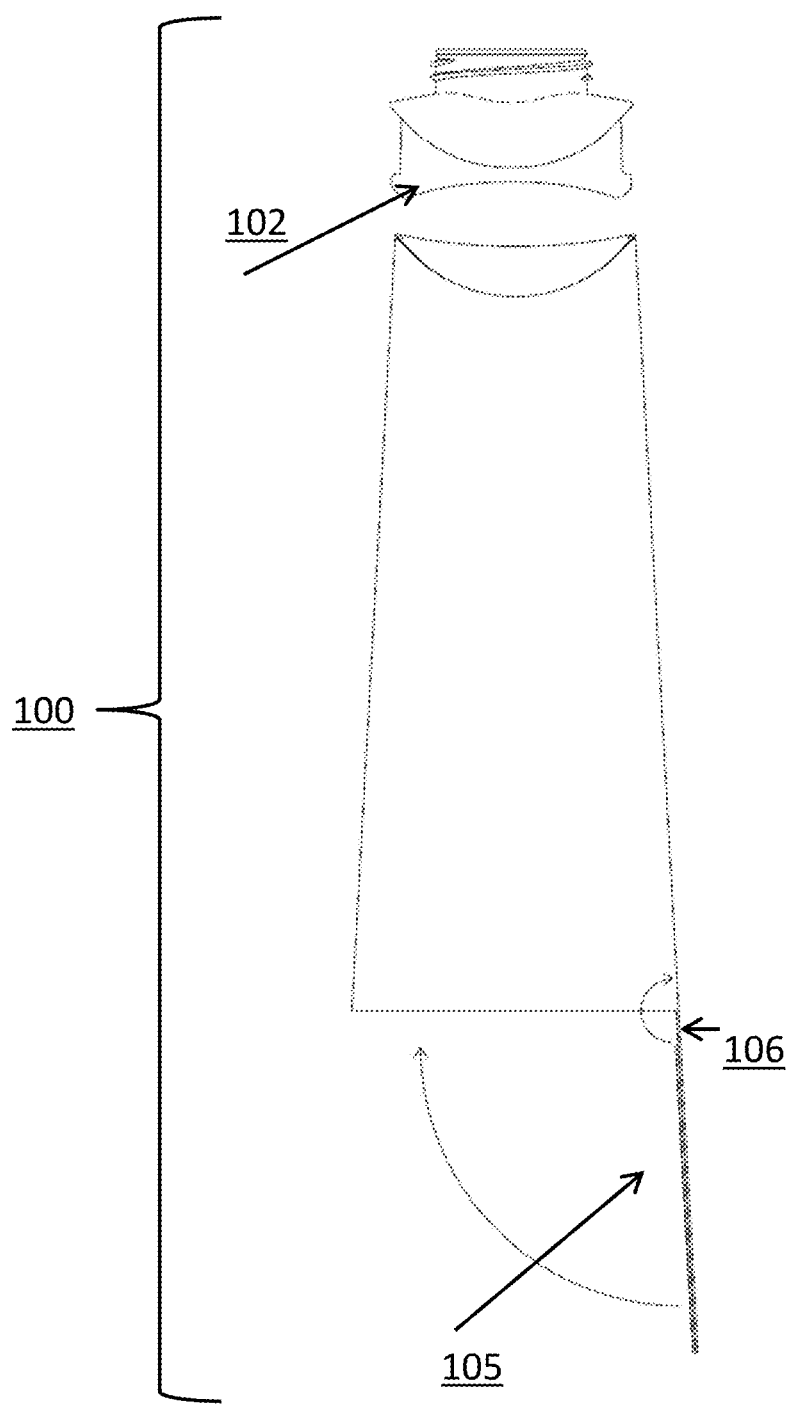
Figure 3C:
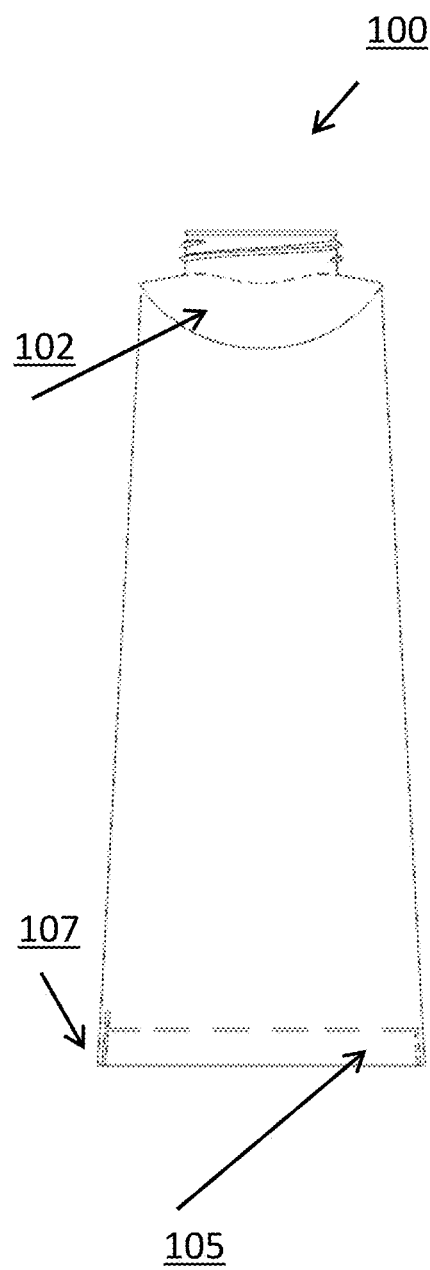

FIGS. 3A, 3B, and 3C depict side-views of beverage container 100. In FIG. 3A, a bottom view of closure shoulder 102 is included. Closure shoulder 102 comprises locking ring 116. In FIG. 3B, it can be seen that bottom flap 105 can move via hinge 106 from a detached position to an attached position, wherein bottom flap 105 closes the bottom of beverage container 100 such that it is substantially perpendicular to the side wall of shell 103. In FIG. 3C, it can be understood that notch 107 engages with the side wall of shell 103 (optionally, by inserting into a slit in the slide wall of shell 103) to hold bottom flap 105 in place.

Figure 4A:
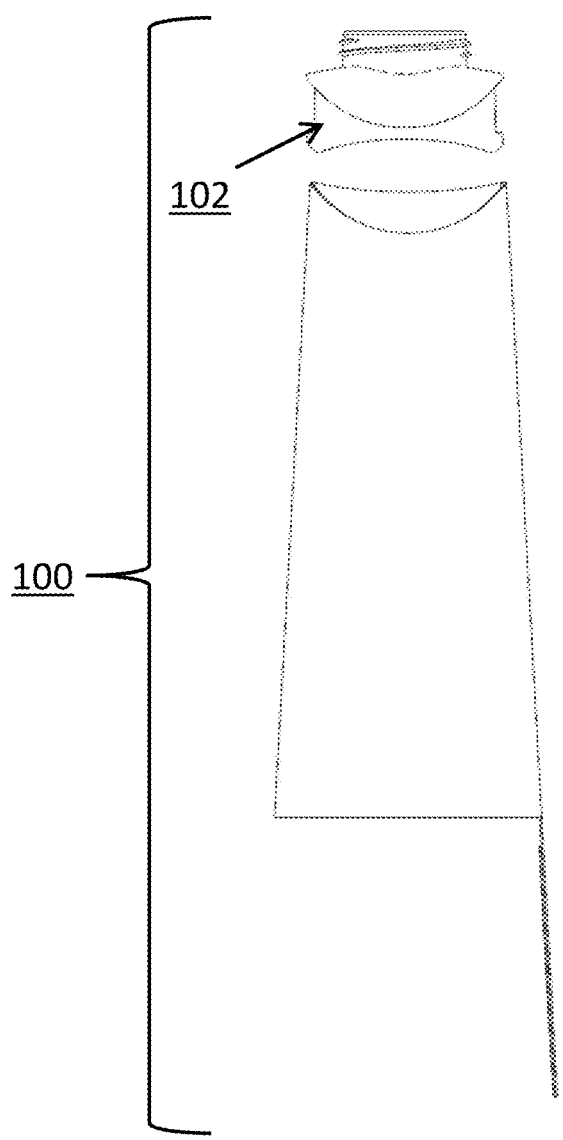
FIGS. 4A and 4B depict a side-view of a locking mechanism in the inventive beverage container.
Figure 4B:
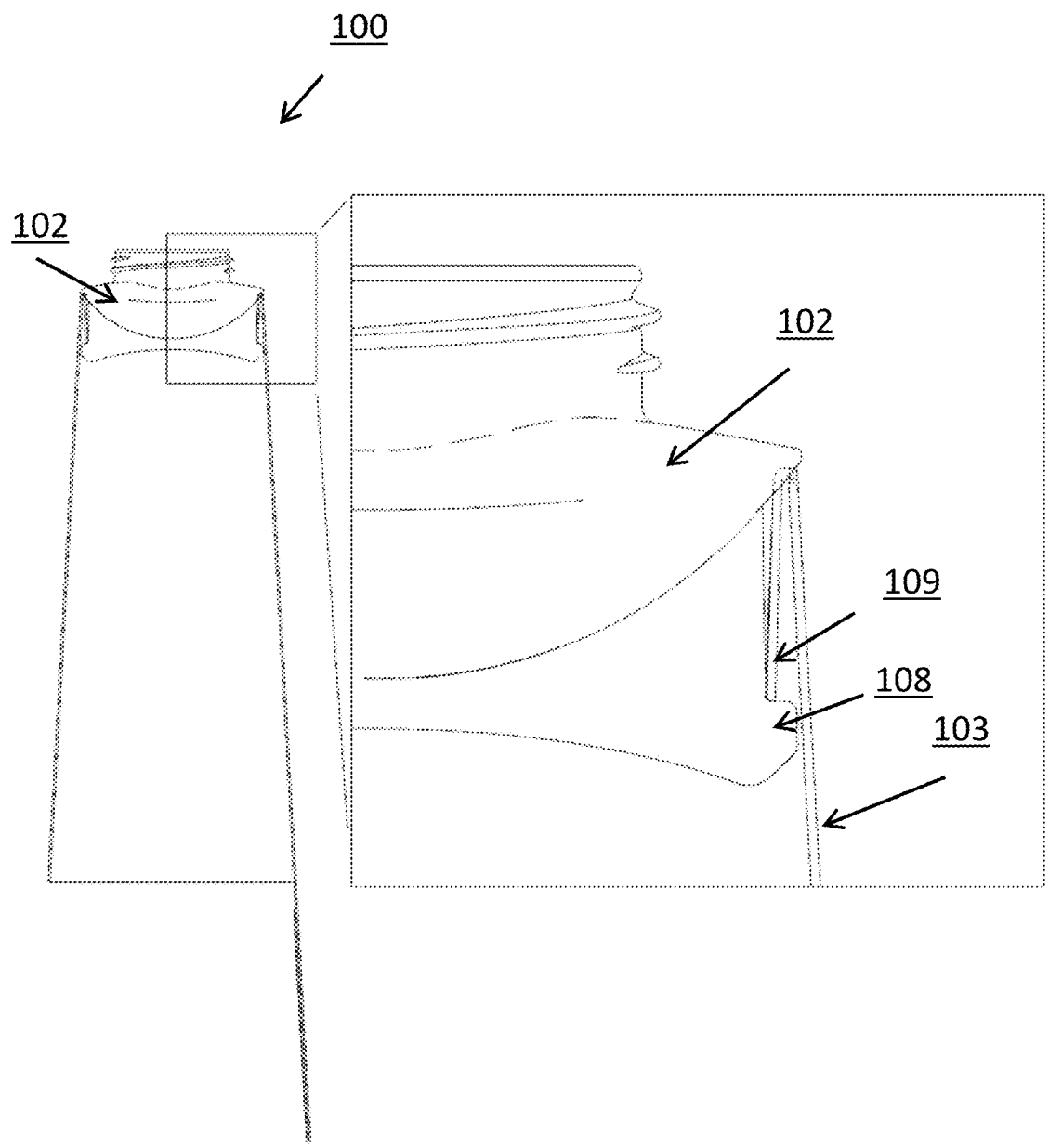

FIGS. 4A and 4B depict additional side-views of beverage container 100. FIG. 4B contains an enlarged view of part of closure shoulder 102 after it is inserted into shell 103. Closure shoulder 102 comprises protrusion 108 formed by a cavity in closure shoulder 102. Shell 103 comprises locking tab 109, which here is part of shell 103 folded downward. Locking tab 109 engages with protrusion 108, which prevents closure shoulder 102 from being pulled out of shell 103 during normal usage by a consumer.

Figure 5A:
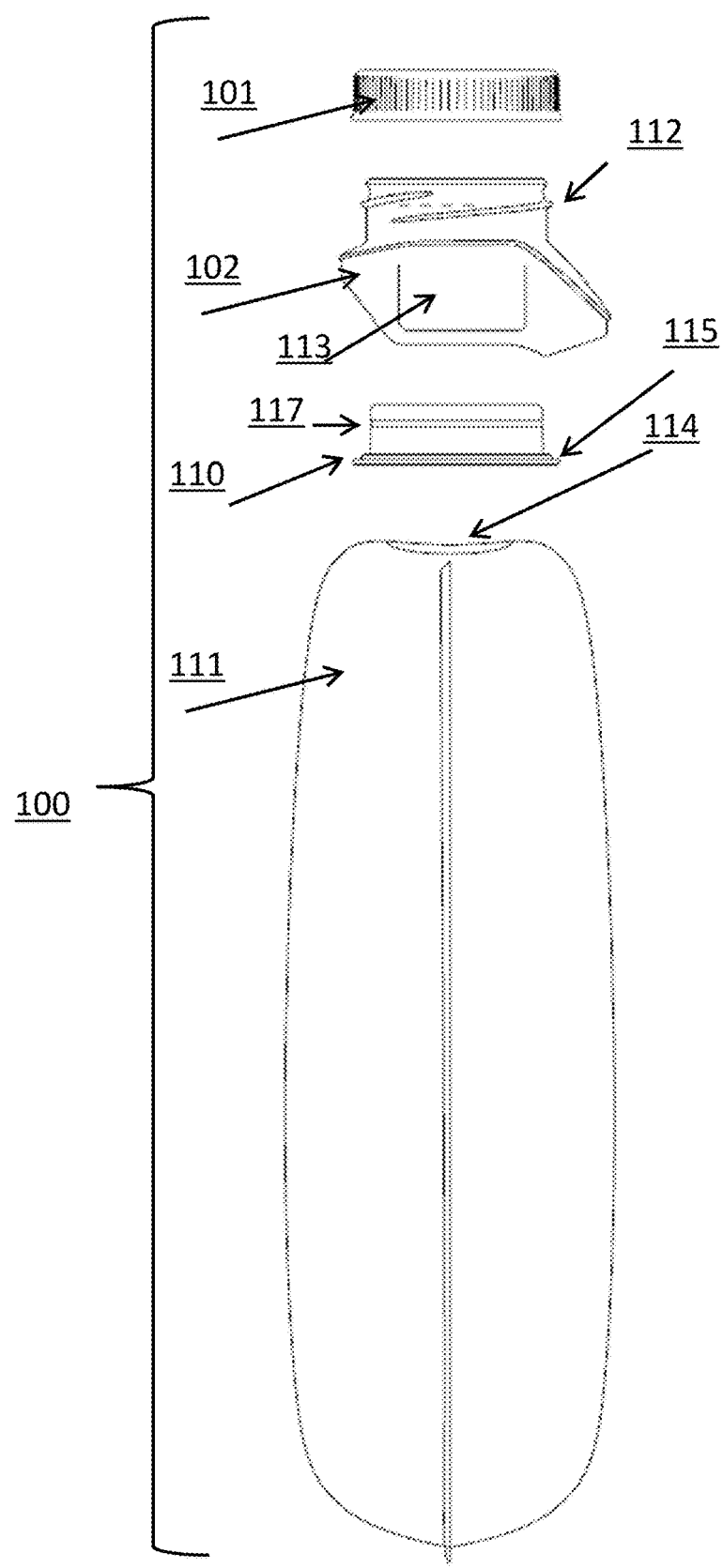
FIGS. 5A and 5B depict a side-view of a securing mechanism in the inventive beverage container that secures a beverage bag between a mechanical sealing ring and the closure shoulder.
Figure 5B:
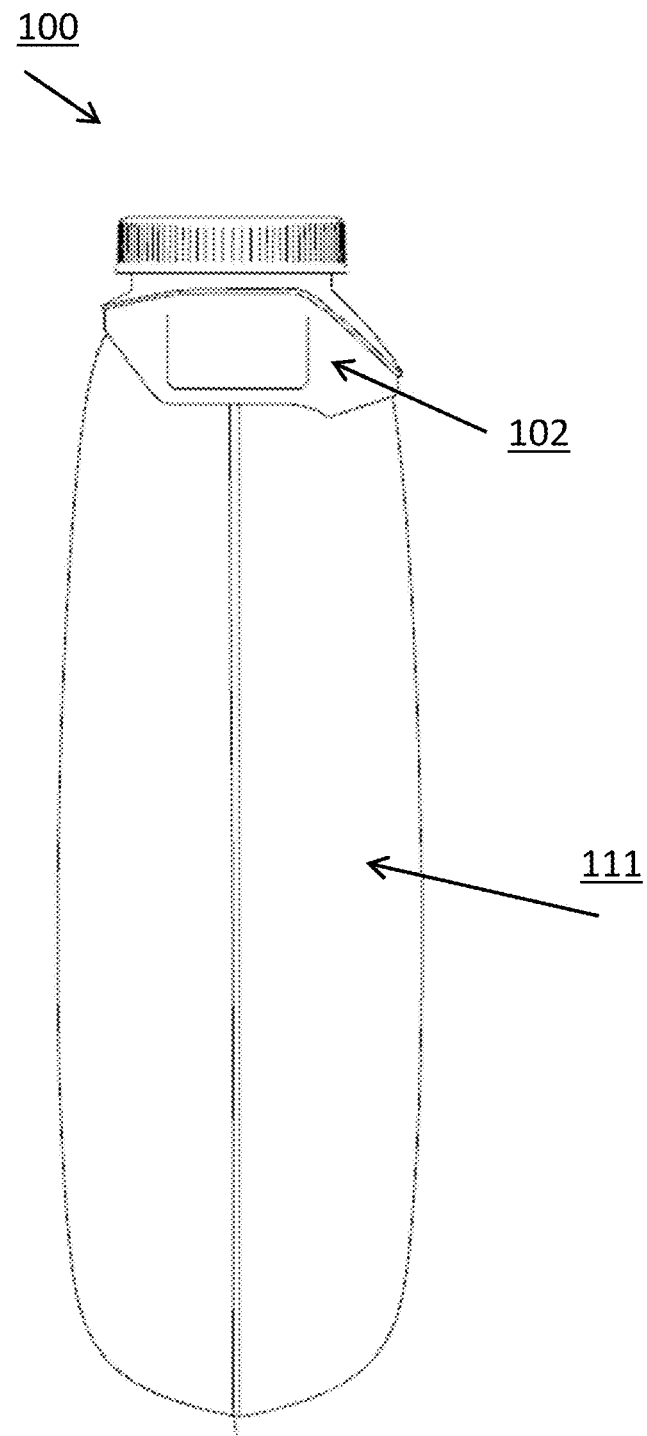

FIGS. 5A and 5B depict additional side-views of beverage container 100. Cap 101 can screw onto a drinking spout 112 of closure shoulder 102. Drinking spout 112 comprises screw threads on its outer vertical surface. Closure shoulder 102 comprises cavity 113, which includes locking ring 116 for receiving locking ring 117 on mechanical sealing ring 110. Beverage container 110 further comprises beverage bag 111, which is capable of holding water or other liquid. The outer diameter of the top surface of the bottom lip 115 of mechanical sealing ring 110 is larger than the opening 114 of beverage bag 111. Optionally, the diameter of locking ring 117 of mechanical sealing ring 110 also is larger than opening 114 of beverage bag 111, such that the opening 114 is stretched to receive mechanical sealing ring 110.

During manufacturing of beverage bag 111, mechanical sealing ring 110 is placed into beverage bag 111 from the bottom of beverage bag 111 (which initially is open on the bottom). Mechanical sealing ring 110 is then moved upward until opening 114 rests on top surface of the bottom lip 115 of mechanical sealing ring 110. Mechanical sealing ring 110 is then pushed into closure shoulder 102 such that locking ring 117 is pushed over locking ring 116, which locks mechanical sealing ring 110 into place within closure shoulder 102, which secures beverage bag 111 to closure shoulder 102. The bottom of beverage bag 111 is then sealed using heat, ultrasound (e.g., Ultrasonic welding), or other known means.

Figure 6A:
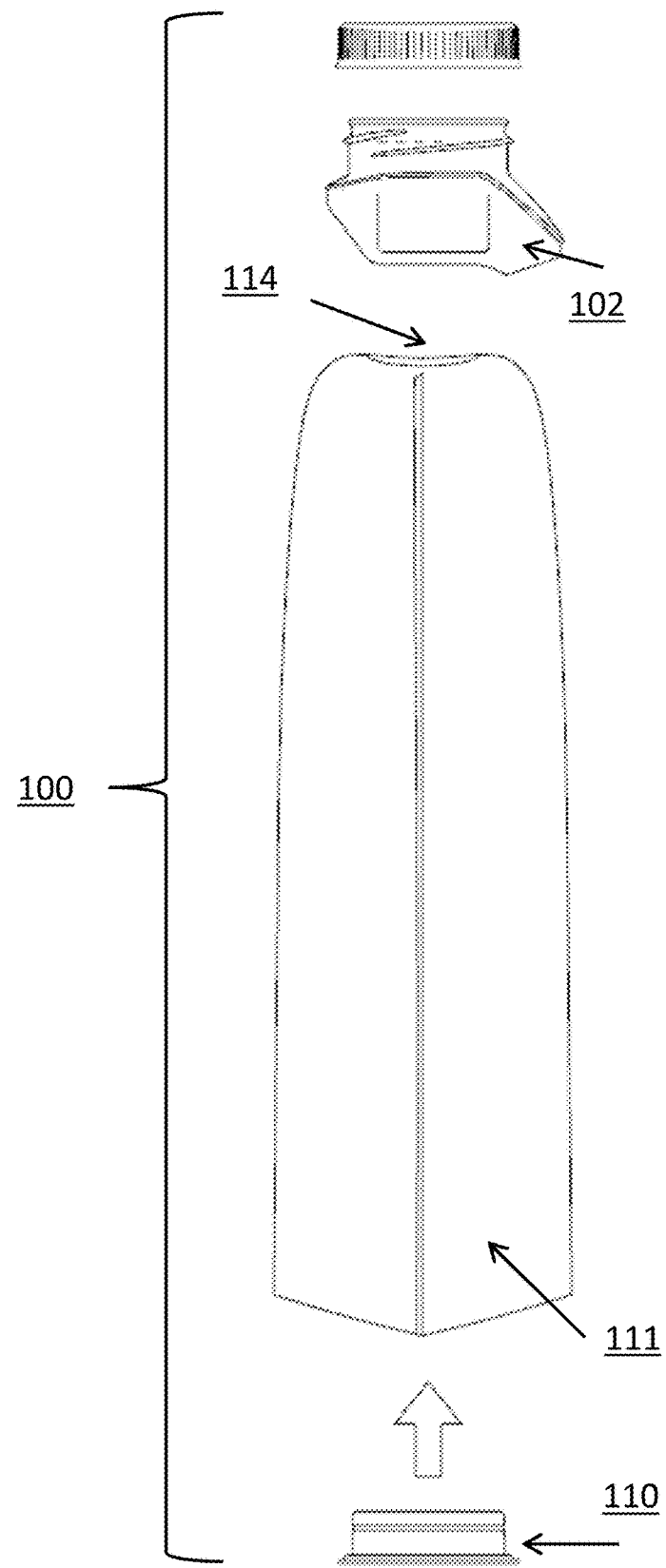
FIGS. 6A, 6B, and 6C depict a side-view of the inventive beverage container in various states of assembly.
Figure 6B:
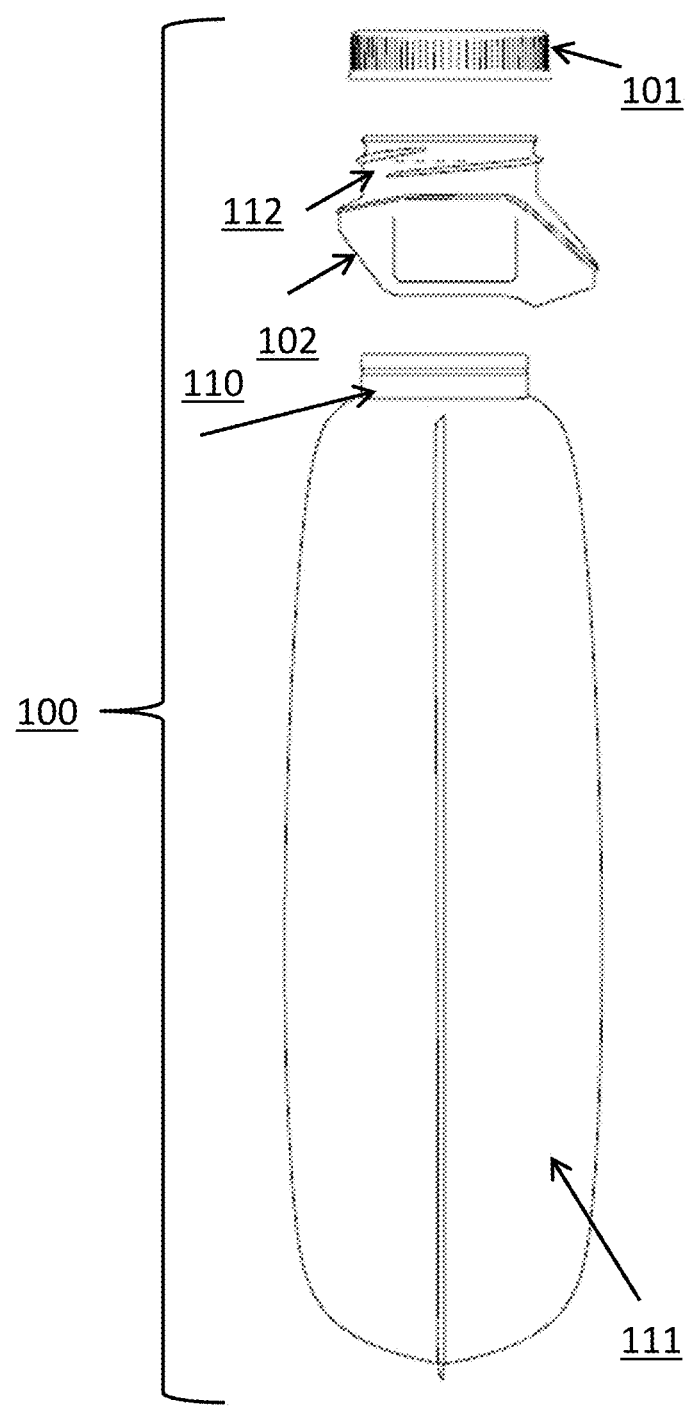
Figure 6C:
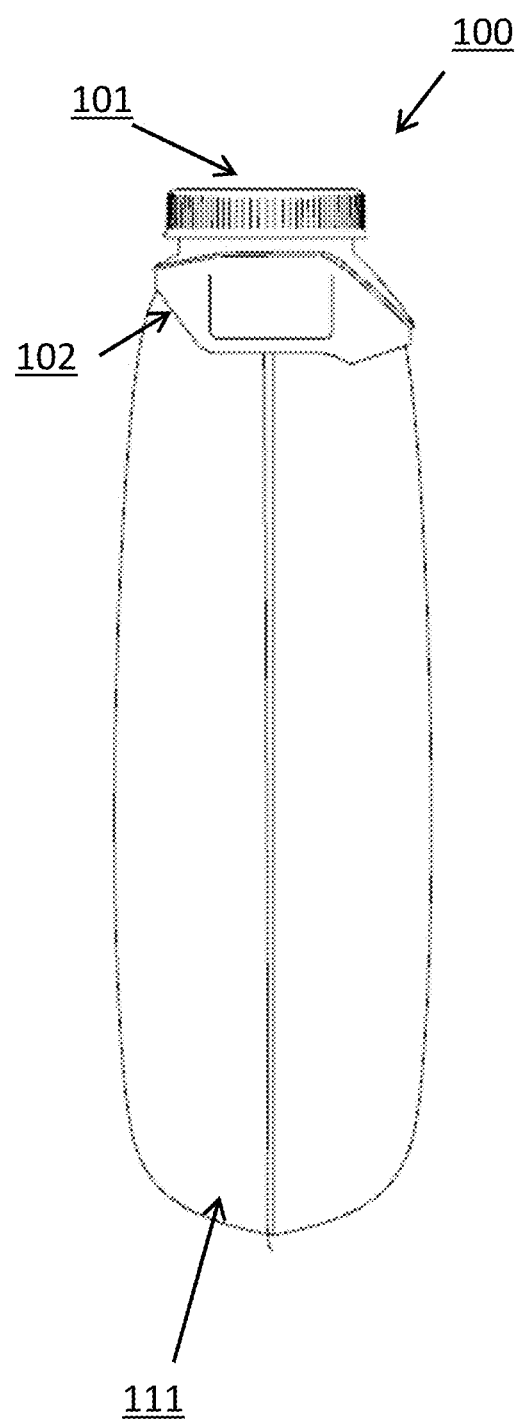

FIGS. 6A, 6B, and 6C depict additional side-views of beverage container 100. In FIG. 6A, beverage bag 111 has an open bottom. Mechanical sealing ring 110 is placed through the bottom of beverage bag 111 (as discussed above) and is secured to closure shoulder 102. In FIG. 6B, mechanical sealing ring 110 extends through opening 114 of beverage bag 111 (which has now been sealed on the bottom) and is secured to closure shoulder 102. In FIG. 6C, cap 101 is screwed onto threads of drinking spout 112.

Figure 7:
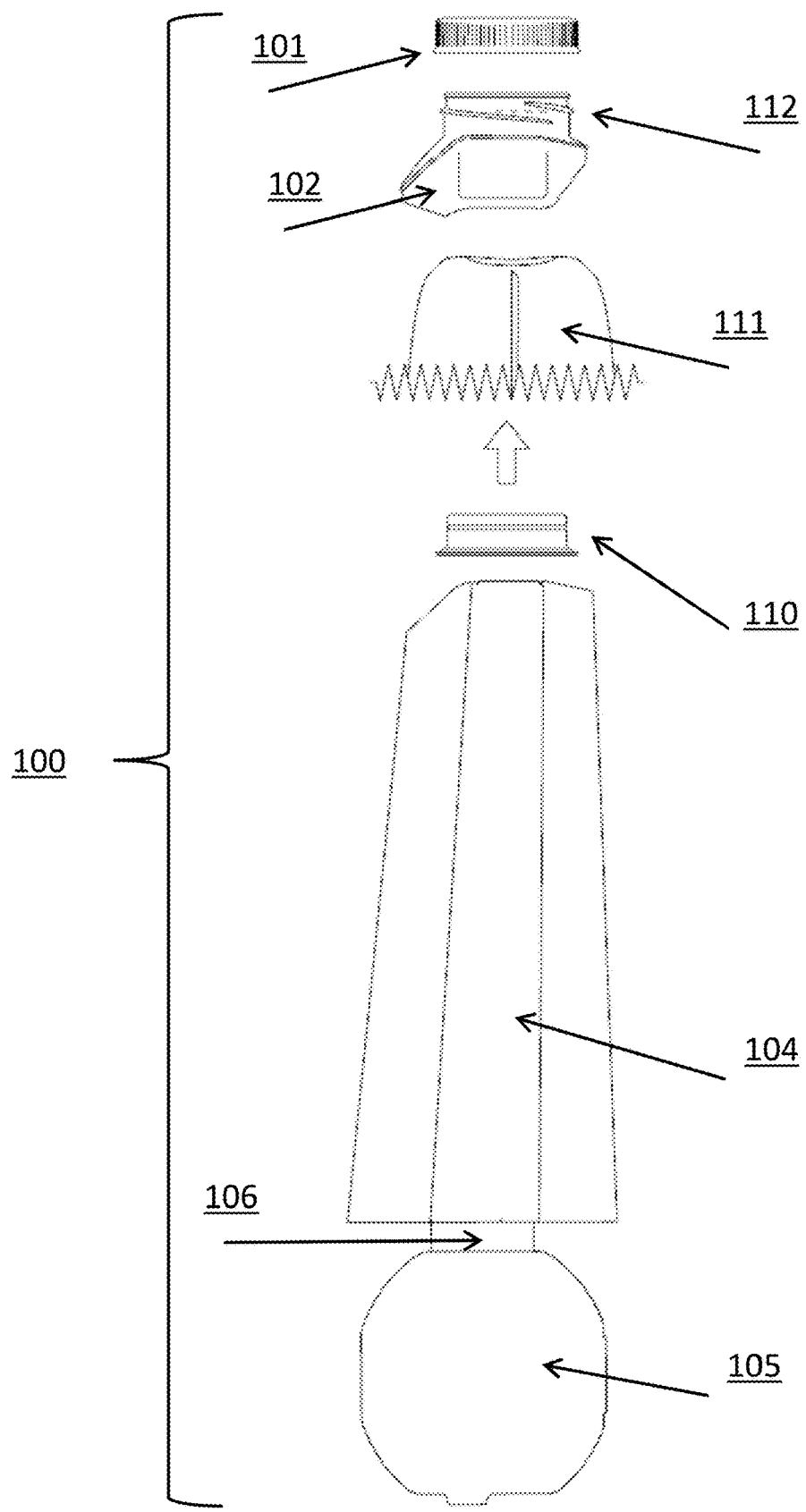
FIG. 7 depicts an exploded side view of various components of the inventive beverage container.

FIG. 7 depicts another side-view of beverage container 100. Again, mechanical sealing ring 110 is secured to closure shoulder 102, which secures beverage bag 111 between mechanical sealing ring 110 and closure shoulder 102 in a watertight fashion.

Figures 8A, 8B:
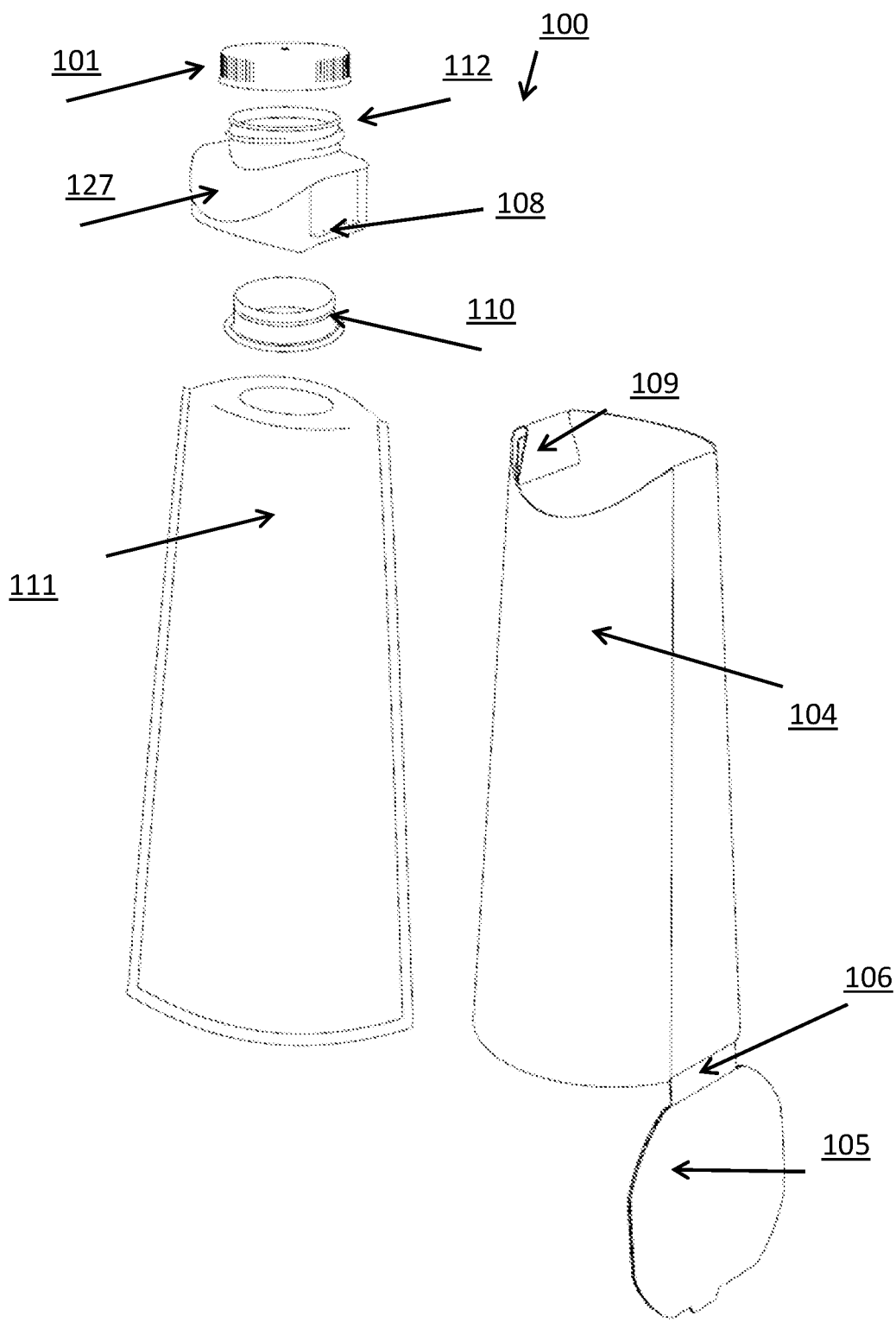
FIGS. 8A and 8B depict another exploded side view of various components of the inventive beverage container.

FIGS. 8A and 8B depict another side-view of components of beverage container 100. Locking tab 109 and protrusion 108 are depicted.

With reference to now to FIGS. 1-8 the assembly of beverage container 100 will be further discussed. Shell 103 optionally comprises cellulose fiber. Optionally, graphics can be printed on shell 103 to indicate the location where the beverage container is being sold, or to provide advertising. Shell 103 is cut into a two dimensional flat shape and run through a standard automatic folder-gluer to fold the shell and glue it on its side, as well as to glue the bottom flap 105. Mechanical sealing ring 110, closure shoulder 102, and cap 101 are all injection-molded, preferably using compostable polymers. Beverage bag 111 is blow-molded and then heat-sealed to the form a bag. The bottom of beverage bag 111 is sealed after the mechanical sealing ring 110 is inserted into beverage bag 111.

The assembly comprising beverage bag 111 and sealing ring 110 is inserted into cavity 113 of closure shoulder 102, where collectively those components form a liquid-tight seal and are permanently fixed because of a strong push-fit and engagement of locking rings 116 and 117. The bottom of beverage bag 111 is then heat sealed, leaving only one opening in beverage bag 111 (i.e., drinking spout 112 on closure shoulder 102, through opening 114). Cap 101 is then tightened onto drinking spout 112 resulting in a sealed container. The sealed container is then inserted into shell 103, securing the closure assembly to it without the use of adhesives.

Beverage container 100 is an improvement over the container disclosed in the Kiosk Application. In the Kiosk Application and in the invention described herein, the beverage container is stored in the kiosk with a cap pre-installed. In the Kiosk Application, the cap contains a hole through which the beverage is injected. By contrast, in the present application, cap 101 contains no holes. This reduces the complexity of the cap design and manufacturing process and also provides a more watertight enclosure. In the present invention, during the filling and dispensing process, cap 101 is removed from drinking spout 112, the container is filled, and cap 101 is reattached.

Thus, the method described in this application has various benefits. The container can be filled more quickly. There is less dripping or splashing of the liquid during the dispensing process. The cap is easier and less costly to manufacture. The cap design is sleeker. These are all important benefits that distinguish the current invention from the previous invention.

Figure 9:
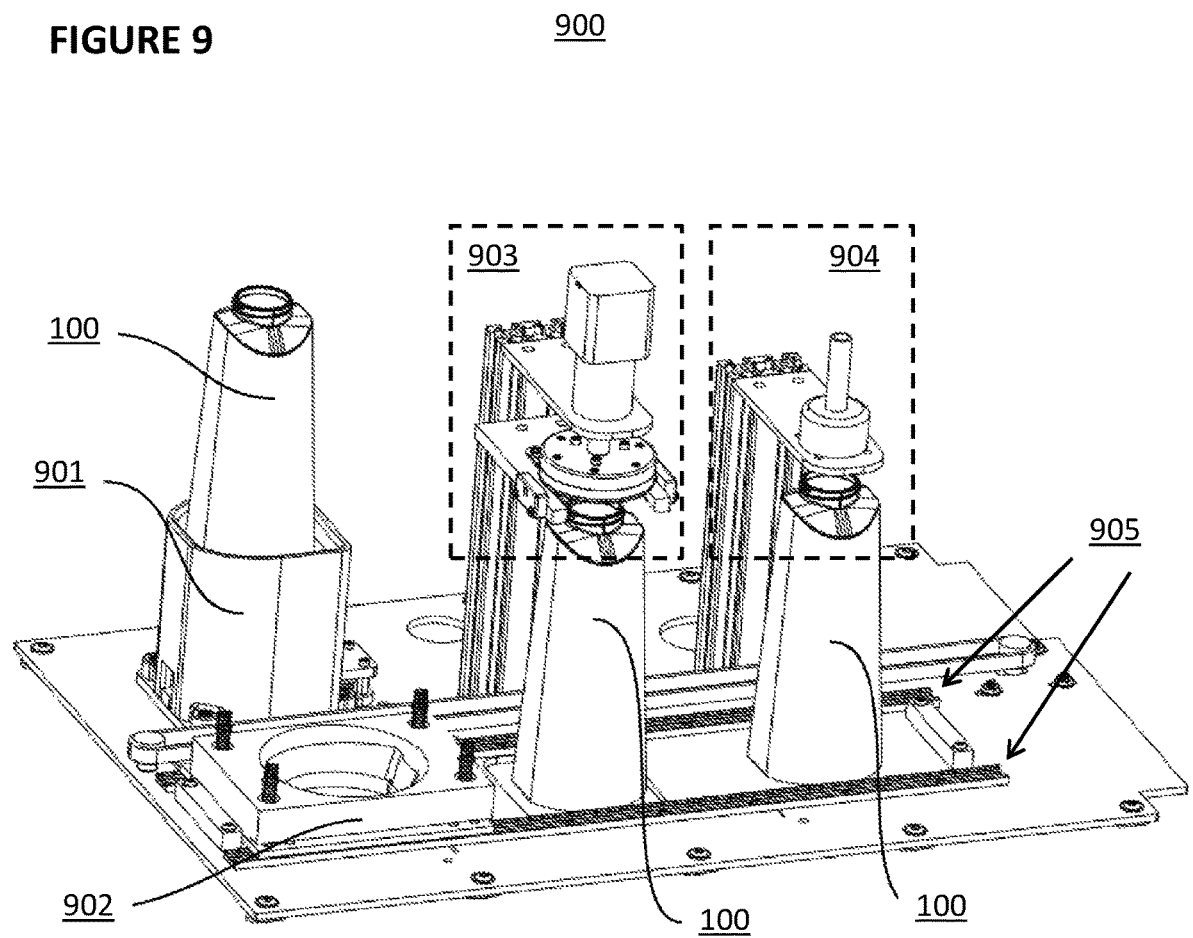
FIG. 9 depicts a capping system for receiving a beverage container, detaching the cap, filling the beverage container, and reattaching the cap.

With reference now to FIG. 9, additional detail is provided about the filling and dispensing process. A capping mechanism 900 is depicted. As shown in FIG. 2B, multiple units of beverage container 100 are stored in a stacked, nested formation, with each bottom flap 105 open. A robot grabs a single unit of beverage container 100 and pushes it into closing unit 901, which pushes bottom flap 105 upward into shell 103, such that notch 107 engages with the sidewall of shell 103 (optionally, by inserting into a slit in the slide wall of shell 103), and closes the bottom of beverage container 100.

The robot then places beverage container 100 into shuttle 902, which moves beverage container 100 along tracks 905 to capping sub-assembly 903 and dispensing sub-assembly 904. Capping sub-assembly 903 engages cap 101, unscrews cap 101 from drinking spout 112, and holds cap 101. Shuttle 902 then moves beverage container 100 along tracks 905 to dispensing sub-assembly 904, where beverage bag 111 is filled with filtered water as discussed in the Kiosk Application. Shuttle 902 then moves beverage container 100 back to capping sub-assembly 903, where capping sub-assembly screws cap 101 back onto drinking spout 112. Beverage container 100 can then be dropped down to a rotating door so a consumer can retrieve beverage container 100 for consumption. Optionally, shuttle 902 can be controlled by belt-driven and/or rod-driven linear actuators powered by electric motors and/or pneumatic actuators.

References to the present invention herein are not intended to limit the scope of any claim or claim term, but instead merely make reference to one or more features that may be covered by one or more of the claims. Materials, processes and numerical examples described above are exemplary only, and should not be deemed to limit the claims.

What is claimed is:

1. A method of assembling and dispensing a beverage from a kiosk, comprising:
   obtaining a beverage container from a stack of nested beverage containers within the kiosk, the beverage container comprising a cap and a closure structure;
   placing the beverage container in a closing unit within the kiosk to close a bottom flap of the beverage container;
   placing the beverage container in a shuttle;
   moving the beverage container, using the shuttle, to a first sub-assembly;
   removing, by the first sub-assembly, the cap from the closure structure;
   moving the beverage container, using the shuttle, to a second sub-assembly;
   filling, by the second sub-assembly, the beverage container with liquid;
   moving the beverage container, using the shuttle, to the first sub-assembly;
   securing, by the first sub-assembly, the cap to the closure structure; and
   dispensing the beverage container from the kiosk.

2. The method of claim 1, wherein the bottom flap comprises a notch that engages with a sidewall of the beverage container.

3. The method of claim 1, wherein the removing step comprises unscrewing the cap from the closure structure.

4. The method of claim 3, wherein the securing step comprises screwing on the cap to the closure structure.

5. The method of claim 1, wherein the beverage container further comprises a bag and a shell.

6. The method of claim 5, wherein the bag holds the liquid.

7. The method of claim 6, wherein the closure structure secures the bag to the shell.

8. The method of claim 7, wherein the beverage container is compostable.

9. The method of claim 8, wherein the cap comprises compostable polymers.

10. The method of claim 1, wherein the liquid comprises filtered water.

11. The method of claim 1, wherein the shuttle moves along a track.

12. The method of claim 11, wherein the shuttle is moved by an actuator.

13. The method of claim 12, wherein the actuator is a belt-driven linear actuator.

14. The method of claim 12, wherein the actuator is a rod-driver linear actuator.

15. The method of claim 12, wherein the actuator is an electrically-powered actuator.

16. The method of claim 12, wherein the actuator is a pneumatic actuator.

17. The method of claim 12, wherein the beverage container is compostable.

18. The method of claim 17, wherein the cap comprises compostable polymers.

19. The method of claim 1, wherein the beverage container is compostable.

20. The method of claim 19, wherein the cap comprises compostable polymers.

* * * * *